L. L. MAXHIMER, H. & E. B. TRUBEY.
Vehicle-Wheel Hub.

No. 220,981. Patented Oct. 28, 1879.

UNITED STATES PATENT OFFICE.

LEONARD L. MAXHIMER, HARMON TRUBEY, AND ESDRAS B. TRUBEY, OF BEACH CITY, OHIO.

IMPROVEMENT IN VEHICLE-WHEEL HUBS.

Specification forming part of Letters Patent No. 220,981, dated October 28, 1879; application filed September 13, 1879.

*To all whom it may concern:*

Be it known that we, LEONARD L. MAXHIMER, HARMON TRUBEY, and ESDRAS B. TRUBEY, of Beach City, in the county of Stark and State of Ohio, have invented certain new and useful Improvements in Wheels for Vehicles; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The first part of this invention relates to the hub, and the second part thereof to the means for attaching the same to the axle.

The principal object of the first part of the invention is to secure in the hub a capacity of contraction to overcome the evil effects of the shrinkage of the spokes.

To this end the invention consists in a metallic hub made in two parts and bolted together, the spokes being clamped between the parts and resting in a recess of peculiar form, adapted to impart strength and rigidity to the hub, as hereinafter described.

The object of the second part of the invention is to obtain in a carriage-wheel great facility of adjustment to and removal from the axle.

To this end the invention consists in linchpins passing through the shell of the hub and into a circumferential groove in the axle-spindle, and held in place by means of springs, as hereinafter described.

In the drawings, Figure 1 is a longitudinal section of the improved hub as seen on the axle-spindle, taken on line $y\ y$ of Fig. 2. Fig. 2 is a cross-section of the same, taken on line $x\ x$ of Fig. 1. Fig. 3 represents the inner end of either part of the hub, showing the peculiar dished form thereof and the holes for the bolts which clamp the parts together. Fig. 4 is a perspective view of the lower end of one of the spokes.

The hub is composed of two sections or parts, A B. Each part is made separately, of cast-iron, steel, or other suitable material. The parts are so made and put together as to form a circumferential recess, G, in the center of the hub, between the two parts for receiving the spokes. The base of this recess is formed by the projecting ends or barrels C, and the sides by the flanges A' B' of the respective sections. The sides of the recess are vertical at $a$ from the base outward for a distance equal to about half their depth, and thence are convex, contracting the recess near the circumference of the hub, forming lips or shoulders $b$ for holding the spokes. The spokes S are adapted to fit the circumferential recess G, their ends resting against the barrels C, or forming a circular arch around the same, and their faces against one another, completely filling the space between the sections of the hub and forming a solid circular series.

About half of that part of the spoke embraced within the recess is rectangular, and the other half of the inclosed part is concaved on each side, forming an inner shoulder, $c$, and an outer shoulder, $d$, the former of which prevents the retraction of the spokes, and the latter may serve as a rest therefor. The flanges A' B' are provided with bolt-holes $h$.

In putting the parts together to form the wheel, the ends of the spokes are laid into the dished end of one of the metallic sections of the hub, forming the solid circular series; then the other cross-section of the hub is placed over the whole, and the bolts $k$, for uniting the parts, are inserted, and the nuts being turned tightly, the spokes are firmly clamped between the sections. In order to admit the bolts, the spokes are provided with semicircular grooves $n$ on one face, and the grooved faces of adjoining spokes are turned toward each other, the meeting grooves forming a bolt-hole.

The pattern from which the hub is cast may be made in one piece, its outer contour and the circumferential recess being turned in a lathe. The recess is cut to within half an inch (more or less) of the axle-box, or axle-spindle, if no axle-box be used, leaving a barrel or core shell. When the turning of the pattern is completed, the barrel is severed at or near the center of the recess, thus separating the parts, so that when the casting is made the two sections of the hub will be separate, enabling the spokes to be placed within the recess.

The barrel should be shortened or the spokes made wider than the recess of the pattern, so as to leave a space between the severed ends of the barrel for the parts to move toward each other, in order to bring the cast sections closer together when the spokes shrink, and secure a firm gripe at all times.

The means for holding the wheel in its proper place on the axle-spindle consist of linchpins or keys $f$, extending through slots in the shell of the hub, and into an annular groove, $o$, in the axle-spindle, and springs $t$, attached to the hub and holding said linchpins in said groove. These pins project above the periphery of the hub, and are provided with knobs or rings, which serve as handles, by means of which the pins are withdrawn from the groove.

When the wheel is to be put on or taken off, the pins are drawn out of the groove and the wheel slipped off, the pins readily yielding to the strength of the hand, but forcing the pins back to their places when the hand lets go. A cap will be placed over the outer end of the hub.

A metallic hub made according to our invention combines the properties of strength, simplicity, symmetry, and cheapness.

Our attaching device may be applied to any form of hub, and is at once simple and safe.

What is claimed as the invention is—

1. A metallic hub divided transversely at or near the center, and composed of two similar separate solid sections, having inwardly-projecting barrels integral therewith, and provided with means for clamping the spokes between the sections, substantially as described.

2. The combination of two similar separate solid sections, constituting the hub, the sections having inwardly-projecting barrels integral therewith, and the interior cheeks of the sections being vertical near the barrel and convex near the circumference, a solid series of spokes adapted to fit the cheeks, and bolts clamping the parts, all substantially as described.

3. A carriage-wheel hub provided with one or more linchpins projecting through the shell thereof, and adapted to enter and move in an annular groove in the axle-spindle, and also projecting beyond the periphery of the hub, and having knobs or rings adapted to serve as handles for retracting the same, in combination with a spring or springs attached to the hub, which operate to hold said linchpins in said groove and permit their ready retraction when it is desired to remove or replace the wheel, substantially as described.

In testimony that we claim the foregoing we have hereunto set our hands this 10th day of September, 1879.

LEONARD L. MAXHIMER.
HARMON TRUBEY.
ESDRAS B. TRUBEY.

Witnesses:
J. M. TRUBEY,
FREEMAN TRUBEY.